United States Patent [19]

Perlman et al.

[11] 3,859,702

[45] Jan. 14, 1975

[54] METHOD FOR ASSEMBLING ROLLER BEARING REMOTE CONTROL CABLES

[75] Inventors: Sheldon E. Perlman, Wyncote; John C. Ion, Doylestown, both of Pa.

[73] Assignee: Teleflex Incorporated, North Wales, Pa.

[22] Filed: Apr. 1, 1974

[21] Appl. No.: 457,077

Related U.S. Application Data

[62] Division of Ser. No. 348,411, April 5, 1973, Pat. No. 3,831,249.

[52] U.S. Cl. .......................................... 29/148.4 A
[51] Int. Cl. ........................................... B23p 11/00
[58] Field of Search .......... 29/148.4 A, 201, 201 D, 29/148.4 R

[56] References Cited
UNITED STATES PATENTS 3,521,341 7/1970 Hornlein et al. ................ 29/148.4 A
3,631,731 1/1972 Llanelly et al. ............ 29/148.4 A X

*Primary Examiner*—Thomas H. Eager
*Attorney, Agent, or Firm*—McGlynn & Milton

[57] ABSTRACT

A method for assembling the components of a roller bearing remote control cable. The components of the control include an outer sheath or conduit in which are disposed bearing races, a center core, ball bearings on either side of the center core and engaging the respective bearing races with ball separator strips separating the ball bearings on each side of the center core. The method includes providing first and second pluralities of aligned balls and feeding the separator strips adjacent the balls to load the strips with the balls. Additionally, the separator strips loaded with the balls are inserted into the sheath or conduit along with the bearing races and center core.

2 Claims, 7 Drawing Figures

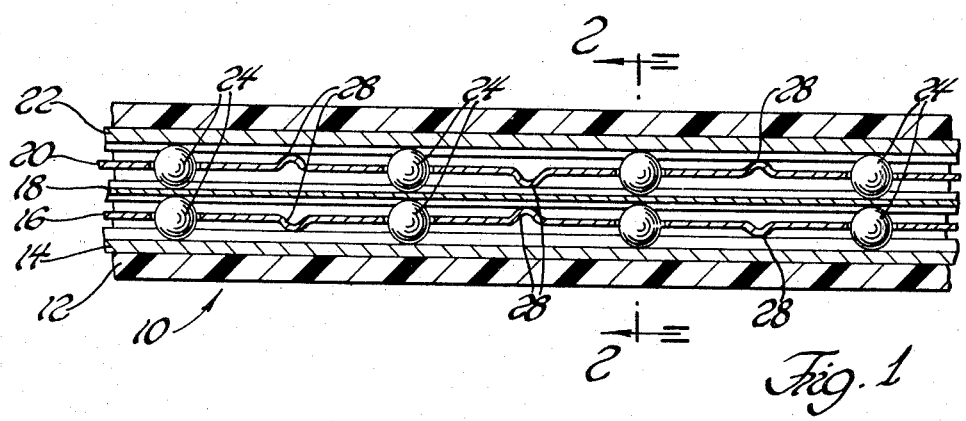
Fig. 1
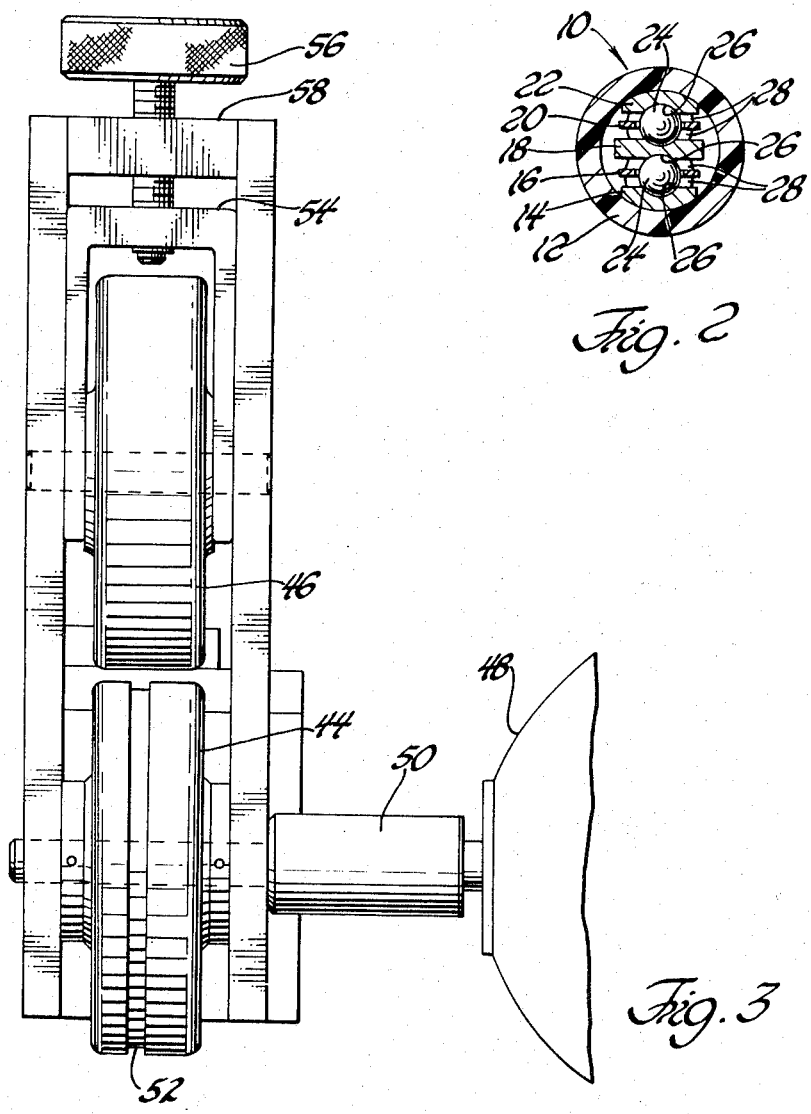
Fig. 2
Fig. 3

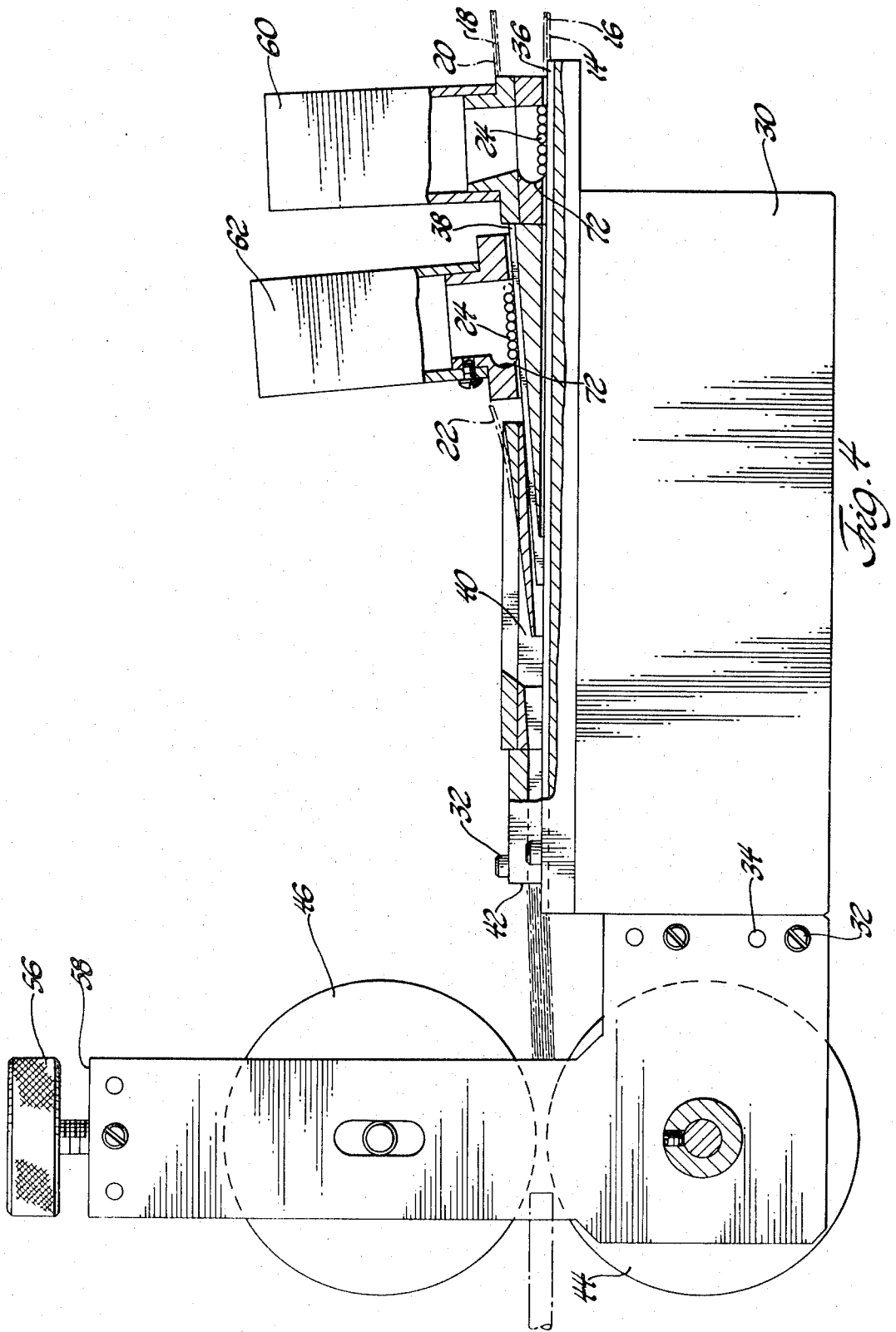

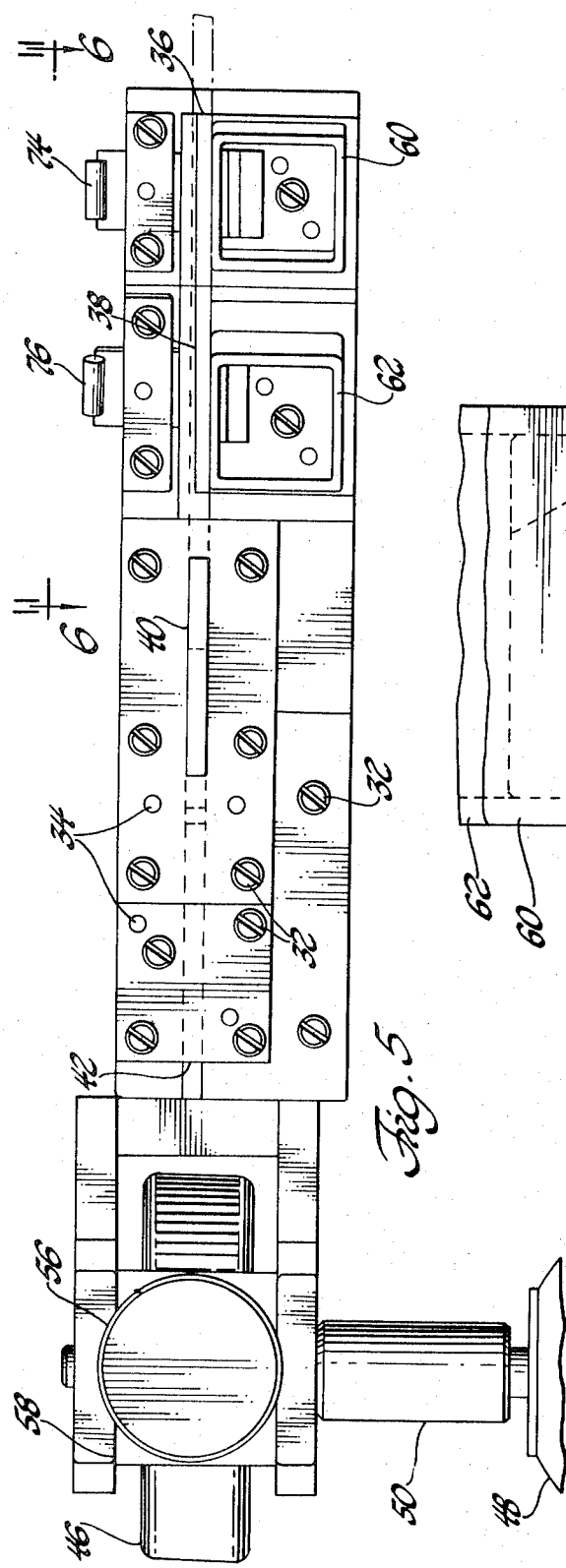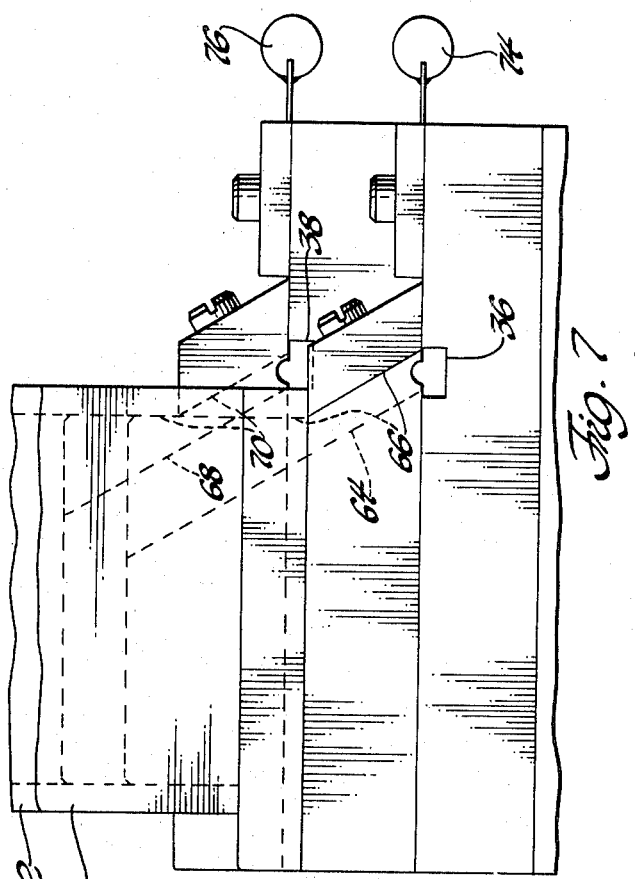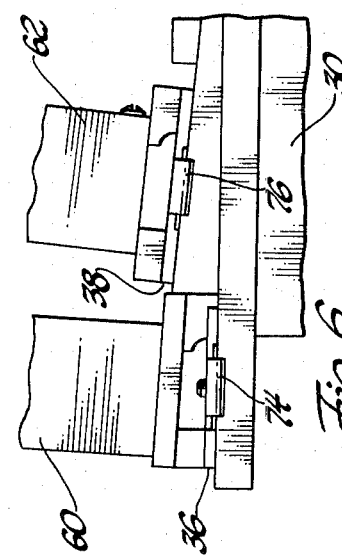

METHOD FOR ASSEMBLING ROLLER BEARING REMOTE CONTROL CABLES

This application is a Divisional of Application Ser. No. 348,411, filed Apr. 5, 1973, now U.S. Pat. No. 3,831,249.

This invention relates to a method for assembling the components of a roller bearing remote control cable.

Push-pull motion transmitting control cables are useful to transmit motion to remote or inaccessible locations; they are also useful if it is desired to provide a centralized control point from which regulation or control at a plurality of separated controlled points is achieved. Conventional push-pull motion transmitting remote control cables are frequently unsatisfactory if the separation between the control point and the controlled point is great, or if the interconnecting path between these points requires sharp turns or bends for the cable. In these latter situations roller bearing remote control cables are preferred.

The assembly of a roller bearing remote control cable is considerably more difficult than the assembly of conventional push-pull motion transmitting control cables. The fabrication difficulties arise from the need to load the control cable with ball bearings and to retain the ball bearings in position in anticipation of final assembly. In this regard it is notable that it is quite important that a ball bearing be loaded in each ball bearing position of the roller bearing remote control cable to ensure proper operation of that cable. Accordingly, it is imperative that a properly aligned ball be available to fill each ball position of the roller bearing remote control cable during assembly. If the balls jam in the ball loading apparatus, or if a ball position of the roller bearing remote control cable is not filled with a ball, downtime is required in the manufacturing process to correct the malfunction. These maintenance and reliability difficulties attendant the production of roller bearing remote control cables have not been satisfactorily solved in the prior art.

The method of the instant invention obviates ball jam-ups and unfilled ball positions in the assembled roller bearing remote control cable. The apparatus disclosed herein to perform the method of the subject invention uses gravity feed ball bearing hoppers provided with converging wall portions to align several ball bearings for assembly in the roller bearing remote control cable being fabricated. The dimensions and tolerances of these gravity feed ball bearing hoppers, and the concept of a line of several ball bearings for assembly, preclude ball bearing jam-ups in the apparatus thereby increasing reliability and reducing maintenance requirements. Second, the line of ball bearings available from these gravity feed hoppers are disposed in alignment with the ball separator strips to load those strips during assembly operations. In this loading technique, each ball bearing position in the separator strip passes several aligned balls to ensure that each ball position is filled before the position passes the last ball in the line. For example, the position might not receive the first ball in the line, but this does not result in an unfilled position since the position can be filled by any of several subsequent balls in the line.

In the apparatus disclosed to perform the method, three confluent passages are fed, respectively, a first outer bearing race overlaid by a first elongated ball separator strip, a center core overlaid by a second elongated ball separator strip, and a second outer bearing race. Ball bearings from two gravity feed ball bearing hoppers are aligned with each of the passages carrying an elongated ball separator strip, and these ball bearings load the elongated ball separator strips as the strips pass the lines of balls. The first outer bearing race, the first elongated ball separator strip loaded with balls, the center core, the second elongated ball separator strip loaded with balls, and the second outer bearing race pass through a common passageway to a pair of wheels which frictionally engage the assembled components for alignment with and insertion into an outer sheath to complete the assembly of the roller bearing remote control cable.

Additional features and advantages of the present invention will be apparent from the following description, taken in connection with the accompanying drawings, in which:

FIG. 1 is a partial sectional view of a roller bearing remote control cable illustrating the radial relationships between the various components of the cable;

FIG. 2 is an axial sectional view of the roller bearing remote control cable of FIG. 1 taken along line 2—2;

FIG. 3 is an end view of the apparatus disclosed to perform the method of the present invention;

FIG. 4 is a partial sectional side view of the disclosed apparatus;

FIG. 5 is a top view of the disclosed apparatus;

FIG. 6 is a partial sectional view of the disclosed apparatus taken along line 6—6 of FIG. 5; and FIG. 7 is an enlarged partial sectional end view of the disclosed apparatus taken at the end of the apparatus opposite the end shown in FIG. 3.

Reference should now be made to the drawings, and more particularly to the sectional views of FIGS. 1 and 2 showing a roller bearing remote control cable generally designated 10 of a type assembled by the method of the present invention. The cable 10 includes an outer sheath 12, a first outer bearing race 14, a first elongated ball separator strip 16, a motion transmitting member or center core 18, a second elongated ball separator strip 20, a second outer bearing race 22, and a plurality of balls 24 loaded in the elongated ball separator strips 16 and 20. The outer bearing races 14 and 22 and the center core 18 are provided with grooves or troughs 26 slidably engaging the balls 24 as best illustrated in FIG. 2. The elongated ball separator strips include a plurality of integral spacers 28 to position these ball separators substantially midway between the outer bearing races 14 and 22 and the center core 18 as illustrated.

FIGS. 3–7 are various views of an exemplary apparatus for performing the method of the present invention and which, as noted above, is used for assembling roller bearing remote control cables including those of the type illustrated in FIGS. 1 and 2. The apparatus includes a base 30 to which various elements of the apparatus are mounted by mounting screws 32 after alignment with alignment pins 34. The elements of the apparatus define a passage 36 adapted to pass an elongated ball separator strip overlaying an outer bearing race, for example the elongated ball separator strip 16 overlaying the outer bearing race 14 as illustrated in FIGS. 1 and 2. A similar second passage 38 defined by the elements of the apparatus is adapted to pass a second elongated ball separator strip overlaying a center core member, for example the elongated ball separator strip 20 overlaying the center core member 18 as illustrated in FIGS. 1 and 2. A third passage 40 of the apparatus is adapted to receive a second outer bearing race, for example the outer bearing race 22 of FIGS. 1 and 2. The outer bearing race 14, the elongated ball separator strip 16, the center core 18, the elongated ball separator strip 20, and the outer bearing race 22 are all illustrated in phantom line in their respective passages in the side view of the apparatus shown in FIG. 4. The passage 36, the passage 38, and the passage 40 are confluent passages communicating with a passageway 42 adapted to receive the assembled components of the roller bearing remote control cable comprising, for example, the first outer bearing race 14, the first elongated ball separator strip 16 loaded with balls 24, the center core 18, the second elongated ball separator strip 20 loaded with balls 24, and the second outer bearing race 22.

The assembled components of the control cable are automatically fed through the apparatus by a means comprising a first wheel 44 and a second wheel 46 adapted to frictionally engage the assembled components. A conventional electric motor 48 is drivingly engaged with the wheel 44 through a coupling member 50. The wheels 44 and 46 function as a means for aligning assembled components of the roller bearing remote control cable with an outer sheath or conduit, for example the outer sheath or conduit 12 of FIGS. 1 and 2. This alignment is effected by the groove 52 in the circumference of the wheel 44. The wheel 46 is carried in a yoke 54 adjustable by rotation of a knurled knob 56 engaging the yoke 54 and threadedly engaging a frame member 58. Adjustments in the position of the wheel 46 are effective to regulate the friction pressure applied to the assembled components of the control cable by the wheels 44 and 46. When the outer sheath of the control cable is held in position by clamping or otherwise, the wheels 44 and 46 can insert the assembled components of the control cable into that outer sheath as the wheels 44 and 46 rotate.

During the process of assembling a roller bearing remote control cable, balls are loaded in the elongated ball separator strips of that cable as those strips are fed through the passages 36 and 38. A hopper 60 supplies balls for loading in the ball separator passing through the passage 36. This hopper provides a plurality of aligned balls confronting and in alignment with the passage 28 as illustrated in phantom lines in FIG. 4. Similarly, a second hopper 62 provides balls for the elongated ball separator strip passing through the passage 38. The hopper 62 is operative to provide a plurality of aligned balls confronting and in alignment with the passage 38 as illustrated in phantom line in FIG. 4. The hoppers 60 and 62 are gravity feed hoppers provided with converging wall portions to align the balls with the passages 36 and 38; these converging wall portions of the hoppers 60 and 62 form chutes through which balls are fed to the passages for loading in ball separator strips passing therethrough. Converging wall portions 64 and 66, shown in FIG. 7 define the chute of hopper 60, and converging wall portions 68 and 70 define the chute of hopper 62. The dimensions of the bottoms of the respective chutes are such that a single line of several balls is disposed adjacent both the passage 36 and the passage 38; as illustrated in FIG. 5, the passages 36 and 38 pass alongside the hoppers 60 and 62. Each chute has a curved portion 72 illustrated in FIG. 4, to permit the balls to roll up the end of the chute as the elongated ball separator strips are fed through the respective passages.

As illustrated in FIGS. 5, 6, and 7, the hoppers 60 and 62 are displaced from one another in the direction of feed of the roller bearing remote control cable components through the apparatus. Additionally, the hopper 62 is vertically raised from the hopper 60 as shown in FIG. 6. A sliding closure means 74 is provided such that the hopper 60 can be closed to prevent balls from passing from that hopper to the passage 36. A similar closure means 76 is effective to close the hopper 62 by closing the bottom of the chute supplying balls from the hopper 62 to the passage 38. The closure means 74 and 76 are laterally slidable to open and close, respectively, the hoppers 60 and 62, and each closure means is manually operable by the operator of the apparatus when it is desirable to close the associated hopper.

The disclosed apparatus performs a method for assembling the components of a roller bearing remote control cable 10. The components of the control 10 include an outer sheath or conduit 12 in which are disposed bearing races 14 and 22. A center core 18, ball bearings 24 on either side of the center core 18 and engaging the respective bearing races 14 and 22 with ball separator strips 16 and 20 separating the ball bearings 24 on each side of the center core 18. The method includes providing first and second pluralities of aligned balls 24 and feeding the separator strips 16 and 20 adjacent the balls 24 to load the strips 16 and 20 with the balls. Additionally, the separator strips 16 and 20 loaded with the balls 24 are inserted into the sheath or conduit 12 along with the bearing races 14 and 22 and center core 18.

The embodiments of the invention in which an exclusive property or privilege is claimed are defined as follows:

1. A method for fabricating a roller bearing remote control cable comprising: providing a plurality of aligned balls, feeding an elongated ball separator strip adjacent said plurality of aligned balls, permitting said balls to load said elongated ball separator strip, providing a second plurality of aligned balls, feeding a second elongated ball separator strip adjacent said second plurality of aligned balls, and permitting said balls to load said second elongated ball separator strip.

2. A method as in claim 1, including inserting a first outer bearing race, the first elongated ball separator strip loaded with balls, a center core, the second elongated ball separator strip loaded with balls, and a second outer bearing race into an outer sheath thereby assembling a roller bearing remote control cable.

* * * * *